US009063633B2

(12) United States Patent
Rajasingham

(10) Patent No.: US 9,063,633 B2
(45) Date of Patent: Jun. 23, 2015

(54) VIRTUAL NAVIGATION SYSTEM FOR VIRTUAL AND REAL SPACES

(76) Inventor: Arjuna Indraeswaran Rajasingham, Bethesda, MD (US)

( * ) Notice: Subject to any disclaimer, the term of this patent is extended or adjusted under 35 U.S.C. 154(b) by 732 days.

(21) Appl. No.: 11/730,161

(22) Filed: Mar. 29, 2007

(65) Prior Publication Data

US 2007/0229396 A1 Oct. 4, 2007

Related U.S. Application Data

(60) Provisional application No. 60/787,444, filed on Mar. 30, 2006.

(51) Int. Cl.

| G06F 3/01 | (2006.01) |
|---|---|
| H04N 13/02 | (2006.01) |
| H04N 13/04 | (2006.01) |
| H04N 7/18 | (2006.01) |
| G06T 19/00 | (2011.01) |
| G06T 15/20 | (2011.01) |
| G02B 27/01 | (2006.01) |
| H04L 29/06 | (2006.01) |
| G06F 3/0481 | (2013.01) |
| H04N 5/232 | (2006.01) |
| G06F 3/0484 | (2013.01) |

(52) U.S. Cl.
CPC ........ *G06F 3/04815* (2013.01); *H04N 5/23238* (2013.01); *G06T 19/003* (2013.01); *G06T 15/205* (2013.01); *H04N 13/0221* (2013.01); *H04N 13/044* (2013.01); *H04N 7/185* (2013.01); *G02B 2027/0138* (2013.01); *G02B 27/017* (2013.01); *H04N 7/183* (2013.01); *H04N 13/0217* (2013.01); *G02B 2027/0178* (2013.01); *H04N 13/0242* (2013.01); *G06F 3/04842* (2013.01); *G06F 3/013* (2013.01); *H04L 67/38* (2013.01)

(58) Field of Classification Search
USPC .............................................. 345/8
See application file for complete search history.

(56) References Cited

U.S. PATENT DOCUMENTS

| 4,970,589 | A | * | 11/1990 | Hanson et al. ................ 348/158 |
|---|---|---|---|---|
| 5,355,185 | A | * | 10/1994 | Lee .................................. 351/63 |
| 5,388,990 | A | * | 2/1995 | Beckman ........................ 434/38 |
| 5,623,587 | A | * | 4/1997 | Bulman ........................ 345/630 |
| 5,696,892 | A | * | 12/1997 | Redmann et al. ............. 345/582 |
| 5,717,414 | A | * | 2/1998 | Bergsneider et al. ............. 345/8 |
| 5,734,421 | A | * | 3/1998 | Maguire, Jr. .................. 348/121 |
| 5,784,097 | A | * | 7/1998 | Iinuma et al. .................. 348/43 |
| 5,812,224 | A | * | 9/1998 | Maeda et al. .................. 349/13 |
| 6,028,584 | A | * | 2/2000 | Chiang et al. ................ 345/628 |

(Continued)

FOREIGN PATENT DOCUMENTS

EP 307283 A1 * 3/1989

OTHER PUBLICATIONS

Halo: Combat Evolved, Nov. 15, 2001, IGN, http://www.ign.com/games/halo-combat-evoled/xbox-15922.*

(Continued)

*Primary Examiner* — Patrick F Marinelli

(57) ABSTRACT

A system for Virtual Navigation in real and Virtual Spaces. Such navigation in Virtual spaces may be applied particularly in 3D computer games and 3D programming of motion pictures. Such navigation in real spaces creates a new paradigm in communication and media particularly with unique 3 D video interface devices disclosed in this invention.

31 Claims, 2 Drawing Sheets

(56) References Cited

U.S. PATENT DOCUMENTS

| | | | |
|---|---|---|---|
| 6,172,601 B1* | 1/2001 | Wada et al. | 340/436 |
| 6,182,287 B1* | 1/2001 | Schneidewend et al. | 725/48 |
| 6,184,847 B1* | 2/2001 | Fateh et al. | 345/8 |
| 6,215,498 B1* | 4/2001 | Filo et al. | 345/419 |
| 6,271,842 B1* | 8/2001 | Bardon et al. | 715/848 |
| 6,359,603 B1* | 3/2002 | Zwern | 345/8 |
| 6,542,081 B2* | 4/2003 | Torch | 340/575 |
| 6,665,003 B1* | 12/2003 | Peleg et al. | 348/36 |
| 6,727,865 B1* | 4/2004 | Yonezawa | 345/7 |
| 6,774,869 B2* | 8/2004 | Biocca et al. | 345/8 |
| 7,091,928 B2* | 8/2006 | Rajasingham | 345/7 |
| 7,100,116 B1* | 8/2006 | Shafrir et al. | 715/751 |
| 7,559,834 B1* | 7/2009 | York | 463/2 |
| 7,688,346 B2* | 3/2010 | Richards | 348/36 |
| 7,755,602 B2* | 7/2010 | Tremblay et al. | 345/156 |
| 7,786,891 B2* | 8/2010 | Owens et al. | 340/541 |
| 8,115,769 B1* | 2/2012 | Lymer et al. | 345/440 |
| 8,378,924 B2* | 2/2013 | Jacobsen et al. | 345/7 |
| 2001/0040570 A1* | 11/2001 | Light et al. | 345/419 |
| 2002/0041284 A1* | 4/2002 | Konishi et al. | 345/473 |
| 2002/0084996 A1* | 7/2002 | Temkin et al. | 345/204 |
| 2002/0122014 A1* | 9/2002 | Rajasingham | 345/8 |
| 2002/0171666 A1* | 11/2002 | Endo et al. | 345/619 |
| 2002/0189627 A1* | 12/2002 | Tang | 132/53 |
| 2003/0217158 A1* | 11/2003 | Datta | 709/228 |
| 2005/0083248 A1* | 4/2005 | Biocca et al. | 345/8 |
| 2006/0052112 A1* | 3/2006 | Baussi et al. | 455/456.1 |
| 2006/0143807 A1* | 7/2006 | Udelhofen et al. | 2/425 |
| 2006/0174120 A1* | 8/2006 | Rippy et al. | 713/171 |
| 2006/0288375 A1* | 12/2006 | Ortiz et al. | 725/62 |
| 2007/0294623 A1* | 12/2007 | Saavedra | 715/730 |

OTHER PUBLICATIONS

The Game: Halo 1 LAN Party CTF, Nov. 1, 2011, http://www.youtube.com/watch?v-vhjWnJU2EKY#t=18.*

Geist—GT Video Review, Aug. 26, 2005, http://www.gametrailers.com/reviews/cxblhv/geist-review.*

* cited by examiner

VIRTUAL NAVIGATION SYSTEM FOR VIRTUAL AND REAL SPACES

CROSS REFERENCE TO RELATED APPLICATIONS

U.S. 60/787,444 which is hereby incorporated herein by reference and to which priority is claimed.

SUMMARY

The present invention is a system for navigation in virtual and real spaces—virtually. This virtual system comprises a set of interface devices and a unique network that provides a new approach for virtual navigation of physical and virtual environments.

There are two distinct applications for such virtual navigation: First navigation in a virtual field; and second navigation in a real field.

Navigation in a virtual field would be applications such as hands free navigation in 3-D video games, 3-D computer environments that have 3D needs as in CAD applications and special 3D interfaces that can speed navigation. Such virtual 3D fields can also be multi source 3D TV or Motion Picture programming, where the viewer can have some degrees of navigation freedom in the field of view. In some cases such multiple sources can be interpolated or "stitched" to form a continuum of possible points of view in the 3D field.

Navigation in a Real Field would be an application where the 3D virtual navigation with the device in a real 3D field in real time live programming at any location with possibly multiple sources from a network of members. Such members may be Source Members or User Members. The Sources provide live programming and will have one or more "World Camera(s)" (and/or "World microphone sets" for audio mono, stereo or 3D surround fields) that is aimed in the direction of sight of the Source to see what their members see. (or hear). Multiple World Cameras or Microphones can give a 3D virtual space rendition. The User Members have interface devices to receive the Source programming and navigation devices to navigate the 2D or 3D field of the programming. Such navigation may be with Mice Joysticks or may use the Intelligent Eye (U.S. Pat. No. 7,091,928) for such 3D navigation directly by using the eyes.

In such virtual navigation of real fields an Active Network of members, Source Members agree to share their programming with User Members. The same member may be both a Source Member and a User Member. Arrangements among such members may be reciprocal or for a fee. While such a network is not necessarily active and may simply transfer information from a source node to a user note, an active Network with distributed processing of video and audio information will in most cases provide the distributed computing resources to enable the operation of this infrastructure.

DRAWING DESCRIPTION

PREFERRED EMBODIMENT

Figure 1:
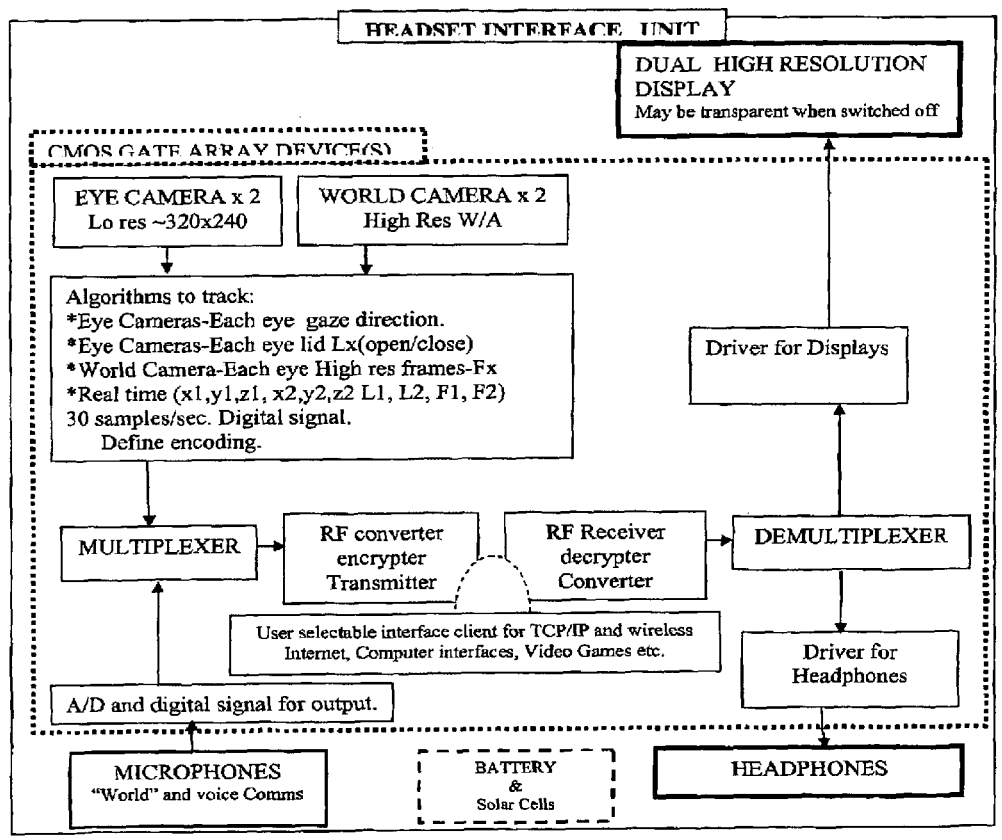
FIG. 1 illustrates the block diagram for a headset/interface.

The Headset/Interface of the User Member/Source Member

The preferred form of the interface is a universal interface for audio and 3D/2D-video communications for the user. A basic form of the device will have a 3-D or stereo video source providing the native field possibly with dual displays, one or more cameras for tracking the gaze and eye blink patters and other possible signaling possibilities with eye appendages of the User, thereby permitting the user to navigate in the available 3D field.

In addition there could be intelligence for interpreting the gaze directions and computing the 3D point of focus. In addition the headset may have the processing required for converting gaze tracking outputs to parametric form in a 3D field.

In addition the device may have a multiple microphone for both voice commands of the user and for the sound field of the user for programming (mono, stereo or surround fields with multiple appropriately placed microphones) and earphones with appropriate sound processing technology for recreating surround sound fields (ideally calibrated to the user anatomy). The field of view may have icons in 3D that may be selected. One possible icon can be to return to the native field of the user Communication of the headset will use one or more standard protocols, cellular or wired network protocols. Moreover the headset unit may have one or more clients and protocols for interface with different kinds of hosts and switching software to meet the communications requirements of the user.

For example the headset may comprise clients and protocols for multiple functions such as computer interface for inputs and outputs for 2&3-D navigation, audio I/O; Email and browser clients for TCP/IP and other internet protocols, interface for a wearable computer or storage device (which may have the same communications clients and protocols as for other host computers) with navigable MP3 or other music and video files for playing and recording by the universal interface. Examples of possible protocols are Wi-Fi protocols, 802.11, Blue tooth, GPRS, EDGE, satellite protocols and revisions and improvements on these.

There may also be clients and protocols to connect directly with other users in the local neighborhood of the user for peer to peer connection without channeling through the Network. For communication in the local peer to peer network or the Network, when any of these hosts are in the range, in this embodiment connection will be preceded by a command from the user and authentication to be a part of a "trusted" network at some predetermined level for the user.

Ergonomic and comfort conditions could make it desirable to locate the heavier parts of the head set at the base of the head/neck and derive additional support from the ears. There may or may not be a need for contact with the front of the face or the nose bridge as in conventional headphones in these embodiments.

In the stand alone environment the Headset will be used with computers or other conventional devices as a user interface where the use of eye and eye appendages navigate (Vclicks) to and select locations in the field. These may be 3-dimensional fields. In the case of 3D navigation the headset may be used for navigation with the eyes in 3D video games, 3D motion picture programming (stereo or synthesized with parallax information from moving objects). Moreover with multiple source cameras—the user may move in the video field to different points and related perspectives, thereby offering a new paradigm in programmed entertainment and Motion pictures.

In addition the User Member may be a Source Member of a Network and would therefore have the apparatus for this. The device headset may therefore have a pair of cluster "World" cameras pointing in the direction of the face of the user (field of view of the User) to capture 3D video inputs for use of the Source Member for distribution on the Network, or recording on a local device as off-line programming.

Wearable Computer

This embodiment will also have an organizer and other basic personal mobility resources. The preferred embodiment will also have a wearable computer that can be accessed by the universal interface using one of the wireless protocols for communication to databases computing capabilities and large MP3 and other audio files and video files for playback by the interface. The wearable computer may also be synchronized to the databases on the universal interface.

The Network

The Network provides multiple Sources for real time video at known physical locations derived from Source Members in the Network, thereby enabling members of the network to navigate among these source points and even to interpolated points between them. Considering that source points may be moving such movement will provide additional information for the reconstruction of fixed objects in the local 3D space of users in any local neighborhood.

Therefore a User Member may choose a physical location or a special interest location and the Network will locate Sources in that location that will appear for selection by the User on the interface. This may be in the form of icons in a 3D field of real time programming derived from a Source. I.e. The field of view of a Source that is available from the World Camera may have icons representing the locations of other Source Members that the User Member can select and "hop" onto The locations of these Members may be determined by the Network using GPS or triangulation methods with radio connections and many other well established approaches in the background art. Selection of other Sources by the User Member may be by clicking or V-clicking on the desired Source. This action will transfer the User Member to the Source World Cameras and microphones of the selected Source Member. Such navigation may be induced by visual or audio stimuli from the currently selected Source Member.

For example the preferred embodiment can be used for interactive access to real video (and audio) fields through the Network. To enable such access the device will have a menu that can select a local environment (some of these can be on a list of bookmarks or can even be on the native environment) and the resulting displayed field will show a starting point as requested and several Sources that may be color coded for accessibility, cost, and quality where the user can navigate to and select with a V-click. On selection, the user video display shows the perspective of the selected Source and the user will passively follow the Source unless the Source has wide angle or cluster World Cameras with the Active Network enabled to pan and zoom in this field, in which case the user has some navigational freedom even within one Source. However, the remaining nodes may still be displayed for further selection and navigation thereto. (there will be menu options to turn off these node displays as well).

The user can therefore hop from one Source Member to another and see (and hear if enabled by Source Member) the perspective of the Source. In addition if enabled by any given Source Member (usually for a fee) interactive dialog with the Source Member and even requesting the source Member to "Show" a preferred field of interest.

This will amount to virtual navigation in a real field.

The Network may be hosted in part by a community of distributed wireless hub providers and other network resource providers. Who (possibly for a fee) provide local wireless bandwidth and other hub intelligence and link into the interne. Such an infrastructure with distributed resources will also enable the high computational needs for reconstruction of 3D local neighborhoods and video processing bandwidth.

The infrastructure of this invention enables new approaches for TV programming with access for viewers to navigate in the real environments of interest in news or documentaries and even interview (possibly for a fee) the Source members of choice in the relevant local environment.

The Network in the preferred embodiment will comprise a distributed network of wireless bandwidth providers (Providers) that for a fee from the Network administrator will provide bandwidth locally to User Members that are a part of the Network. User Members will pay for bandwidth. bandwidth can be hot spots in a local region within a city where many such local regions provide "cellular" coverage for neighborhoods and even cities. These may be substituted for or supplemented with conventional cellular bandwidth with standard billing to the administrator and indeed satellite bandwidth in remote locations. The Providers may be required to have installed in their hubs the computing infrastructure to stitch together the available Sources in the local neighborhood and have the intelligence to accept and hand off dialog with Sources/Users as they move through local neighborhoods. Providers in this preferred embodiment will initially provide bandwidth for a fixed fee set by the Active Network Administrator, and then after the initial probation period set a rate based on the market. Local providers will compete for providing bandwidth. Users will have options in selecting lowest cost or highest available bandwidth (and quality) options when selecting the Providers. Such bandwidth selection may be a background process that is set by the User. Users may select from multiple Providers (which may be other Users or Sources) based on possible fees such Providers may charge through a Network Administrator. This arrangement forms a new Business Model for Distributed Bandwidth.

An additional embodiment incorporates stitching algorithms for interpolation of fields of view available in the Network as Source Nodes, thereby giving the user a continuous or near continuous range of view points and fields even between the available Sources. As the Sources are moving the Active Network can recreate the fixed 3D local landscape and use that video information for interpolation for navigation of users. Such stitching together of local landscapes and city scapes can allow User Members to physically navigate from available Source Nodes in one local neighborhood to another using "Real Maps" created by this interpolation of the fixed landscape. While such interpolation will not be able to give perfect views, the user has the choice of using the available Source Nodes or an interpolation or a combination for zooming out to encompass a wide panorama. Such interpolation processing may be enabled by distributed processing on the Active Network given the computing resources needed for each of the neighborhoods.

The Network will need intelligence to locate the physical location of the sources. These can be done in some embodiments with GPS and in others simply using triangulation from the transmit points of the sources to the recent hubs or host devices that the device has latched onto recently.

If interpolation algorithms are used these will also have interpolated locations from the source locations.

To supplement this, there are well established web based approaches to find physical locations of sources on the internet.

Applications of Network

All the above functionality enables the use of this infrastructure to create virtual tours and expeditions to remote parts of the world or places of interest, where the "tour guide" is a Source Member, that for a fee travels to or through a local neighborhood with User Members selecting (on the Network) the Tour guide's Source.

The nature of documentary and News programs will be transformed by the use of the Active Network and Sources as a verification source and a source of additional information in real time, available in the local environment of the Issue and location of interest. For a fee User Members may even interview first hand the Sources in situ for example in Breaking News. A new concept of verifiable "truth" media is enabled with this invention where Users of the Network can travel virtually to any part of the globe where there are Source Members and discover the reality of news coverage themselves using the "World Cameras" and World Microphones of Source Members. In addition eye witnesses can provide video programming for conventional and off line News coverage. Source Member groups can emerge to provide debates on events as they saw it with verifiable video programming from their World Cameras and Microphones. These Groups can be available on-line on the website of the Network.

Virtual parties and meetings. The invention enables User members to join parties and gatherings of Source Members and hop from the "eyes" of one Source Member to another.

One of the unique characteristics of the video Network is that location of the Sources are relevant for content unlike conventional media such as mobile phones and Network based phone services. Moreover, this invention enables navigation in that video field which is a new and unique characteristic of this invention.

ALTERNATIVE EMBODIMENTS

The virtual navigation system may be used to navigate in 2D visual or in text based lexicographic or other ordering of Sources. The Stimuli—from the Sources may be Audio or Visual or both and may be mono (audio), 2D or 3D/Surround for audio and Visual.

Some embodiments may utilize either live or programmed 2D video data to synthesize 3D fields by using time lagged images to create parallax information from objects identified with object recognition algorithms.

A simple alternative embodiment of the User/Source interface for 2D video is a Computer or a mobile/cell phone (with cameras for Source functionality)

The headset in an alternative embodiment may be similar to conventional eye glasses supported on the nose bridge and ears.

A fixed wired interface adapter may be used to interface between the wireless Universal Interface and conventional video game consoles and computers with only conventional controller outputs/inputs.

A split mobile unit is an alternative embodiment where the functionality of the device is split between a light headset and a connected wearable interface (wired or wirelessly). Here the headset—here has only interface functions. Wearable computer has all data and computing functions.

The headset embodiment may have minimal componentry on the headset to lower weight and offload much of the processing to a wire connected or wireless connected wearable interface. One possible embodiment would have a pair of cameras for gaze and eye tracking, a microphone and the processing required for gaze tracking outputs in parametric form along with one or more audio channels for voice commands and communication. There will also be earphones for one or both ears.

An alternative to the headset/interface is a fixed device with a 3D projection device and cameras to track gaze and the eyes along with a microphone. It is an alternative to the mobile version and may also used wired Internet connections for the user.

ADDITIONAL EMBODIMENTS

Ergonomics of the Headset

Figure 3:
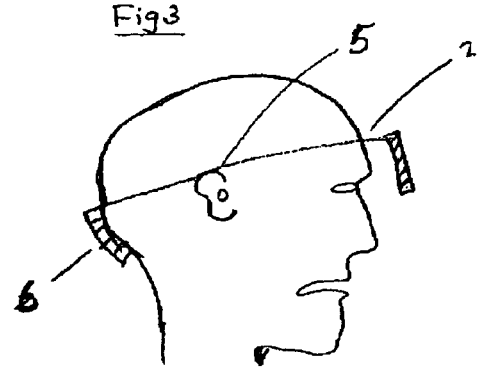
FIG. 3 shows the headset supported by the ear and the external occipital protuberance.
Figure 4:
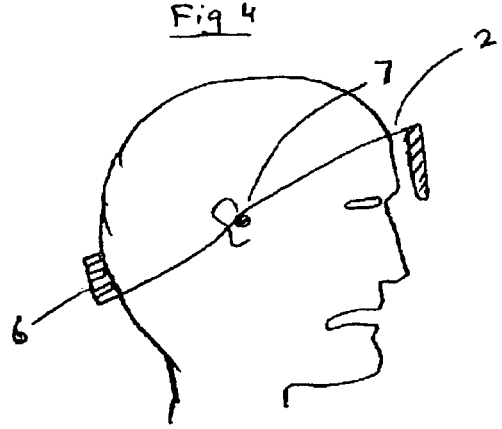
FIG. 4 shows the headset supported by the ear canal or possibly the bone orifice of the ear.

Support on the ear (5—FIG. 3), and/or the ear canal (7—FIG. 4) and possibly the bone orifice of the ear (7—FIG. 4). Considering that a significant portion of the weight of the headset (2—FIG. 3, FIG. 4) will be in the front of the head, the rear of the headset may be used to contain heavy components to balance out the load. If the rear section is lighter than the front section the had set may rest on the External occipital protuberance (6—FIG. 3, FIG. 4) and allow articulation of the head at the occipital condoyle without significant disturbance of the headset position.

Figure 2:
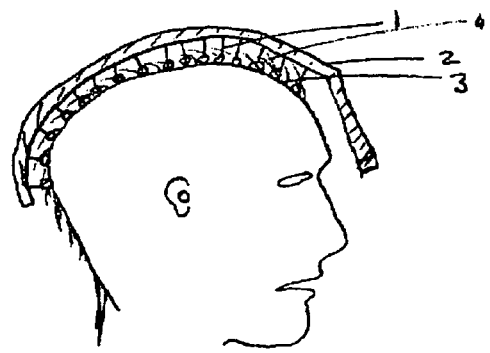
FIG. 2 shows the Headset with a large number of soft headed thin fingers to support on the scalp.

Considering that many users of the headset (2—FIG. 2) may not wish to have their hair compressed with a fitted helmet, another design allows for a large number of soft headed thin fingers (1—FIG. 2) that touch the scalp (3—FIG. 2) through the hair (4—FIG. 2). The impact on hair will be not much different to a comb. Moreover, such a design will provide excellent ventilation in a helmet design.

Hardware on Headset

Rear view camera: Particularly when the module with all the heavier componentry is located at the base of the head at the neck, there are synergies in having a rear view "World" camera as well on the module.

Wide angle or multi camera World with network directional intelligence

The World cameras may be wide angle or clusters to give a broader field of view for network members, along with network intelligence to navigate within the panoramic filed data.

Outdoor version—solar cells/cap on sun shield: Solar cells will reduce the physical load of batteries on the head and synergistically provide protection for the user.

For use in remote locations—satellite antenna: Satellite antennae can be attached to the sun shield/cap independently of or incorporated with the solar cells.

Visual displays—transparent option: To allow for real navigation in the native real space (!) the Visual display may have the option to become transparent or semi transparent.

Pan & Zoom on "world cameras": Pan and zoom capabilities in the World Camera will give in a 1-1 arrangement between a User and a Source (usually for a fee) the ability to orient the camera to the desired field within the available Source hardware.

Audio/Video Player data: The Audio and video files may be stored on the device rather than on a wearable computer or remotely.

Organizer: May be on the Interface device rather than on a wearable computer.

Computer: The headset may include a basic computer with related functionality for stand alone use.

A system for virtual navigation of one or both of real and virtual spaces, comprising a network of members that are either or both of Sources and Users, wherein Sources provide real time media input to the network and Users consume real time media input provided by one or more Sources, and wherein each of the Sources are enabled with one or both of video and audio recording devices, and said Users are enabled with one or both of video and audio reception devices, and wherein the experiences of the Sources may be transmitted to the Users, and wherein the Users are enabled to move among one or more Sources.

A system, as described above, wherein the sources are enabled with stereoscopic World Cameras as media input devices and are thereby enabled to transmit 3D virtual environment to the Users in the Network.

The invention claimed is:

1. A system for virtual navigation of one or both of a real space and a virtual space, comprising:
    a User Member with a user interface with at least one digital communication protocol, in an Active Network comprising computing resources to enable a navigation infrastructure enabled by at least one of internet and cellular networks, connected to a plurality of Source Members each with a Source,
    wherein said virtual navigation from a first Source Member to a second Source Member enables presentation, to the User Member, of stimuli provided by the Source of the second Source Member and the Active Network that comprises visual stimuli generated by the Source of the second Source Member,
    wherein stimuli comprising a field of view provided by the Source of the First source member and the Active Network comprises selection points at the location of each Source that corresponds to one of the plurality of source Members that are in the field of view of the Source of the First Source Member at the locations in that field of view of Sources of Source Members, and
    wherein said navigation to locations of selection points of Sources of one of the plurality of Source Members in the field of view is enabled by the Active Network enabling User Members to navigate among said Sources and enabling the selection by the User Member of the selection point representing the Source of the Second Source Member on the field of view of the Source of the First Source member,
    wherein said Active Network provides computing resources from at least one computing resource provider, and
    wherein each Source, in a neighborhood, has a Source Node comprising fields of view, and
    wherein the Active Network is enabled to interpolate by stitching together the fields of view of said Source Nodes in order to form fixed landscapes, that are used to create Real Maps, for the subsequent navigation of User Members from one local neighborhood to another.

2. A system for virtual navigation as in claim 1, wherein said User Member with a User Interface is enabled to navigate to a native field of the User Member on said User Interface from a field of view of the user interface by selection of an icon on the user interface.

3. A system for virtual navigation as in claim 1, wherein the source of at least one of the plurality of Source Members comprises stereoscopic World Cameras.

4. A system for virtual navigation as in claim 1, wherein stimuli provided by at least one of the plurality of Source Members comprises audio stimuli from the direction of sight of the Source of the at least one of the plurality of Source Members, and said Source of the at least one of the plurality of Source Members comprises one or more World Microphones.

5. A system for virtual navigation as in claim 1, wherein stimuli provided by the source are spatial three dimensional fields of one or both of video and audio.

6. A system for virtual navigation as in claim 1, further comprising:
    enabling one or both of verifiable Truth Media and virtual tours,
    wherein said verifiable Truth Media is enabled by one or more of said User Members on the Active Network who navigate to one or more of said Source Members, located anywhere on the globe, to receive news coverage using World Cameras of said one or more of said Source Members, and
    wherein said virtual tours are enabled by a selection, by one or more of said User Members, of one of said Source Members as a Tour Guide in a local neighborhood of interest.

7. A system for virtual navigation as in claim 1, further comprising recreating a fixed 3D local landscape and utilizing it for navigation by:
    capturing time lagged images from the Sources of one or more Source Members;
    creating parallax information from said time lagged images;
    reconstructing a 3D landscape of fixed objects, and
    creating an image of fixed landscapes in 3D space
    thereby enabling navigation.

8. A system for virtual navigation as in claim 1, wherein the field of view of the Source of the First Source Member comprises visual stimuli in a direction of view of the Source of the First Source Member.

9. A system for virtual navigation as in claim 1, wherein selection of the selection points for navigation, is enabled with signals from the eyes and eye appendages of the user, that are observed and analyzed by the user interface of the user.

10. A system for virtual navigation as in claim 1, wherein said Active Network provides bandwidth for communication of information between the plurality of Source Members and the User Members, and wherein said bandwidth is provided by a plurality of wireless hub providers that are enabled to connect with one of the plurality of Source Members or the User Members when said one of the plurality of Source Members and the User Members are in the local neighborhood of said bandwidth providers, said bandwidth providers having a connection to one or more communications media that includes at least one of internet protocols, cellular phone protocols, WiFi protocols, and BlueTooth protocols.

11. A system for virtual navigation as in claim 1, further comprising a plurality of User Members and clients and protocols to connect directly between User Members in the same local neighborhood of the Active Network of the User Member for peer to peer connection without channeling through the Active Network, thereby enabling direct communication.

12. A system for virtual navigation as in claim 11, wherein the peer to peer connection is preceded by a command by the User Member, subject to authentication to be part of a trusted network at some predetermined level for the user.

13. A system for virtual navigation as in claim 1, comprising one or both of a plurality of User Members and a plurality of Source Members on the Active Network.

14. A system for virtual navigation as in claim 1, wherein the User Member in the Active Network is a Source Member and at least one of the plurality of Source Members is a second User Member.

15. A system for virtual navigation as in claim 1, wherein the Source of at least one Source Member comprises a pair of cluster cameras.

16. A system for virtual navigation as in claim 1, wherein said visual stimuli provided by at least one Source is video.

17. A system for virtual navigation as in claim 1, wherein said selection points are color coded to represent at least one of cost and programming quality.

18. A system for virtual navigation as in claim 1, wherein the Active Network is enabled to use the motion of the Sources in order to recreate fixed 3D local landscape for use in subsequent navigation of User Members from one neighborhood to another.

19. A system for virtual navigation as in claim 18, wherein physical locations of the Sources are determined with location determining technologies.

20. A system for virtual navigation as in claim 18, wherein selection of the selection points for navigation, is enabled with signals from the eyes and eye appendages of the user, that are observed and analyzed by the user interface of the user.

21. A system for virtual navigation as in claim 1, wherein the Source of one of the plurality of Source Member on the Active Network is on a headset.

22. A system for virtual navigation as in claim 1, for virtual navigation of a real space, by a User Member with a user interface with at least one communication protocol, in a Active Network, connected to a plurality of Source Members each with at least one Source, wherein said Sources are enabled to move, and wherein said virtual navigation from a First Source Member to a Second Source Member enables presentation to the User Member, stimuli provided by the Source of the Second Source Member and the Active Network, comprising visual stimuli generated by the Source of the second Source Member, and wherein stimuli comprising a field of view provided by the Source of the First Source member and the Active Network comprises selection points generated by said Active Network for Sources, in the field of view of the Source of the First Source Member, at the locations in that field of view of Sources of Source Members, and thereby said selection points of locations of said Sources in the field of view of said First Source Member follow the motion of their Sources in said field of view of said First Source Member, and wherein said navigation to the Source of the Second Source Member is enabled by the selection by the User of the selection point representing the Source of the Second Source Member on the field of view of the Source of the First Source member.

23. A system for virtual navigation as in claim 22, further comprising multiple Sources at known physical locations derived from Source Members in the Active Network thereby enabling a User Member to navigate among said multiple Sources by selection of selection points representing said Sources.

24. A system for virtual navigation as in claim 22, wherein at least one Source is a mobile phone comprising a camera.

25. A system for virtual navigation, for virtual navigation of a real space, comprising:
  a User Member with a user interface with at least one digital communication protocol, in an Active Network comprising computing resources to enable a navigation infrastructure enabled by at least one of internet and cellular networks, connected to a plurality of Source Members each with at least one Source,
  wherein said Sources are enabled to move,
  wherein said virtual navigation from a First Source of one of said plurality of Source Members to a Second Source of one of said plurality of Source Members enables presentation, to the User Member, of stimuli provided and generated by the Second Source of the one of said plurality of Source Members and the Active Network,
  wherein the stimuli comprises visual stimuli generated by the second Source of the one of said plurality of Source Members,
  wherein stimuli comprising a field of view provided by the First Source of the one of said plurality of Source Members and the Active Network comprises selection points generated by said Active Network for Sources, in the field of view of the First Source of the one of said plurality of Source Members, at the locations in that field of view of Sources of the plurality of Source Members,
  wherein said selection points of locations of said Sources in the field of view of said First Source of the one of said plurality of Source Members follow the motion of their respective Sources in said field of view of said First Source of the one of said plurality of Source Members enabled by the Active Network enabling User Members to navigate among said Sources, and
  wherein said navigation to the Second Source of the one of said plurality of Source Members is enabled by the selection, from the User Member, of the selection point representing the Second Source of the one of said plurality of Source Members on the field of view of the First Source of the one of said plurality of Source Members,
  wherein each Source, in a neighborhood, has a Source Node comprising fields of view, and
  wherein the Active Network is enabled to interpolate by stitching together the fields of view of said Source Nodes in order to form fixed landscapes, that are used to create Real Maps, for the subsequent navigation of User Members from one neighborhood to another.

26. A system for virtual navigation as in claim 25, wherein said Active Network comprises a plurality of distributed wireless bandwidth providers that provide local bandwidth to User Members.

27. A system for virtual navigation as in claim 26, wherein said one or more of said plurality of distributed wireless bandwidth providers, provide computing infrastructure to the Active Network.

28. A system for virtual navigation as in claim 26, wherein said one or more of said plurality of distributed wireless bandwidth providers to the Active Network are enabled to accept and hand off dialog with one or both of Sources and Users as they move through local neighborhoods.

29. A system for virtual navigation as in claim 25, wherein movement of the Sources enables the Active Network to recreate fixed 3D local landscape for subsequent navigation by User Members.

30. A system for virtual navigation of a real space comprising:
  a User Member with a user interface connected to an Active Network comprising computing resources to enable a navigation infrastructure enabled by at least one of internet and cellular networks with at least one digital communications protocol; and
  a plurality of Source Members each with at least one Source, wherein each Source is enabled to move and therefore offers stimuli comprising at least one field of view;
  wherein a first field of view of one of the at least one Source of the plurality of Source Members comprises selection points,
  wherein said selection points are at the locations of each Source while offering stimuli comprising the at least one field of view, said selection points generated by the Sources, offering stimuli, and the Active Network, wherein virtual navigation of the User Member, from a first field of view of one of the at least one Source of the plurality of Source Members to a second field of view of one of the at least one Source of the plurality of Source Members, is enabled by the Active Network enabling User Members to navigate among said Sources and enabling the selection, by the User Member, of the selection point of the Source offering the stimuli comprising the second field of view, of one of the at least one Source of the plurality of Source Members, on the first field of view of one of the at least one Source of the plurality of Source Members, wherein each Source, in a neighborhood, has a Source Node comprising fields of view, and wherein the Active Network is enabled to interpolate by stitching together the fields of view of said Source Nodes to form fixed landscapes, in order to create Real Maps, for the subsequent navigation of User Members from one neighborhood to another.

31. A system for virtual navigation as in claim 30, wherein said Real Maps comprises recreated fixed 3D local landscapes created by the Active Network with the use of the motion of the Sources.

\* \* \* \* \*